(12) United States Patent
Cole

(10) Patent No.: US 7,448,259 B2
(45) Date of Patent: Nov. 11, 2008

(54) POSITION FEEDBACK DEVICE FOR ROTATABLE MEMBER

(75) Inventor: Alan B. Cole, Wellsville, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 11/507,222

(22) Filed: Aug. 21, 2006

(65) Prior Publication Data

US 2008/0041145 A1   Feb. 21, 2008

(51) Int. Cl.
*G01M 15/00* (2006.01)
(52) U.S. Cl. .................. 73/112.02; 73/114.26
(58) Field of Classification Search .............. 73/112.01, 73/112.02, 112.03, 114.26, 114.27, 114.28, 73/115.01, 115.02
See application file for complete search history.

(56) References Cited

U.S. PATENT DOCUMENTS

| | | | |
|---|---|---|---|
| 802,946 A | 10/1905 | Waterman | |
| 1,961,386 A | 6/1934 | Payne | |
| 2,074,701 A | 3/1937 | Lohmolder | |
| 3,107,080 A | 10/1963 | Priese | |
| 3,338,140 A | 8/1967 | Sheesley | |
| 3,348,375 A | 10/1967 | Gardner et al. | |
| 4,082,115 A | 4/1978 | Gibb et al. | |
| 4,327,894 A | 5/1982 | Ewing et al. | |
| 4,401,260 A | 8/1983 | Grant | |
| 4,566,670 A | 1/1986 | Nordlund | |
| 4,635,901 A | 1/1987 | Pond | |
| 4,647,003 A | 3/1987 | Hilpert et al. | |
| 4,759,386 A | 7/1988 | Grouw, III | |
| 4,986,305 A | 1/1991 | Richards et al. | |
| 5,154,206 A | 10/1992 | Gillott et al. | |
| 5,295,783 A | 3/1994 | Lesko et al. | |
| 5,325,888 A | 7/1994 | Stary | |
| 5,741,180 A | 4/1998 | Xia et al. | |
| 5,860,328 A | 1/1999 | Regueiro | |
| 6,016,832 A | 1/2000 | Vars et al. | |
| 6,049,299 A | 4/2000 | Lunacek et al. | |
| 6,263,742 B1 * | 7/2001 | Gruson et al. ............ | 73/862.23 |
| 6,267,139 B1 | 7/2001 | Miklo et al. | |
| 6,371,439 B1 | 4/2002 | Trevisan | |
| 6,435,169 B1 | 8/2002 | Vogt | |
| 6,659,119 B2 | 12/2003 | Taylor | |
| 6,817,173 B2 | 11/2004 | Paffrath et al. | |
| 6,840,493 B2 | 1/2005 | York et al. | |
| 6,843,265 B2 | 1/2005 | Taylor | |
| 6,860,464 B1 | 3/2005 | Quitmeyer et al. | |

(Continued)

*Primary Examiner*—Eric S McCall
(74) *Attorney, Agent, or Firm*—Haynes and Boone LLP

(57) ABSTRACT

An indicator device is for sensing a valve of a fluid machine including a casing having an interior chamber, a valve controlling flow into the interior chamber, and a rotatable shaft configured to displace the valve between open and closed positions when the shaft moves between first and second angular positions. A first indicator member, preferably a pinion gear, is coupled with the shaft such that angular movement of the shaft angularly displaces the first member. A second indicator member, preferably a rack gear, is coupled with the first member such that the angular displacement of the first member linearly displaces the second member. The second member linear displacement is generally proportional to angular displacement of the first member. Further, a sensor is configured to sense at least one of linear displacement and linear position of the second indicator member so as to sense the position of the valve.

25 Claims, 9 Drawing Sheets

U.S. PATENT DOCUMENTS 6,880,568 B1   4/2005   Taylor
2004/0216782 A1   11/2004   Mares et al.
2005/0247350 A1   11/2005   Coakley et al.

* cited by examiner

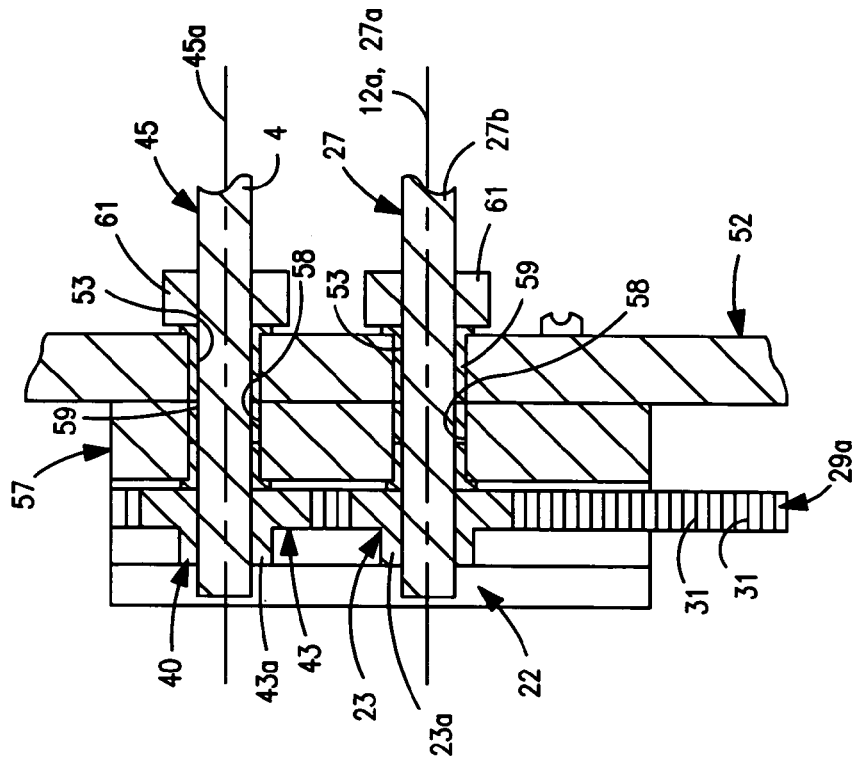
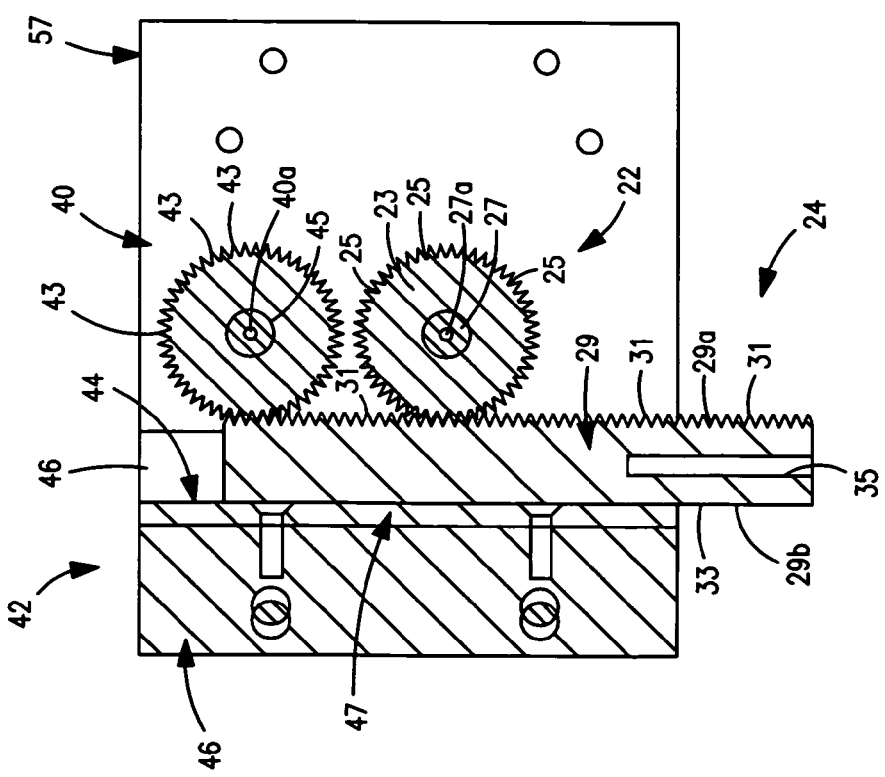
FIG. 7
FIG. 6

POSITION FEEDBACK DEVICE FOR ROTATABLE MEMBER

The present invention relates to fluid machinery such as steam turbines, and more specifically to position feedback devices for such fluid machinery.

Fluid machinery such as steam turbines are known and such turbines basically include a main casing defining a chamber, a rotatable output shaft disposed within the chamber and having at least one portion extending outwardly of the casing, and one or more rotors mounted on the shaft, each rotor having a plurality of vanes or blades. High pressure fluid is directed through one or more nozzles toward each rotor so as to cause rotation thereof to drive the output shaft, and flow through each nozzle is controlled by a valve. Preferably, such steam turbines include a steam distributor assembly or "steam chest" that includes an interior chamber fluidly coupled with a source of steam, a plurality of outlets each fluidly connected with one or more nozzles, and plurality of valves each controlling flow through a separate outlet, and thereby into each nozzle.

Particularly when the steam chest includes a plurality of valves, a valve actuator assembly is provided which includes an actuator, a cam shaft driven by the actuator and having one or more cams, and at least one follower or "lifter" each engaged with a separate one of the cams and configured to open a separate one of the valves. With such an actuator assembly, rotation of the cam shaft causes the lifters to periodically open and close each valve, so as intermittently permit flow through each nozzle to the associated rotor. As it is generally desired to control the timing of the opening and closing of the valves, previous steam turbine designs have been provided with a rotary sensor for determining the rotational movement of the cam shaft, and thereby to provide a control device with feedback information on the valve operation to ensure proper functioning thereof.

SUMMARY OF THE INVENTION

In one aspect, the present invention is an indicator device for sensing an angular position of a rotatable element of a machine. The indicator device comprises a first indicator member coupled with the rotatable element such that angular movement of the rotatable element angularly displaces the first member. A second indicator member is coupled with the first member such that the angular movement of the first member linearly displaces the second member. Further, a sensor is configured to sense at least one of linear position and linear displacement of the second indicator member so as to sense the angular position of the rotatable element.

In another aspect, the present invention is an indicator device for sensing a valve of a fluid machine, the machine including a casing having at least one interior chamber, at least one valve controlling flow into the interior chamber, and a rotatable shaft. The shaft is configured to displace the at least one valve between open and closed positions when the shaft moves between first and second angular positions. The valve indicator device comprises a first indicator member coupled with the shaft such that angular movement of the shaft angularly displaces the first member. A second indicator member is coupled with the first member such that the angular displacement of the first member linearly displaces the second member, the second member linear displacement being generally proportional to angular displacement of the first member. Further, a sensor is configured to sense at least one of linear displacement and linear position of the second indicator member so as to sense the position of the valve.

In a further aspect, the present invention is a steam turbine comprising a casing having at least one interior chamber and a valve controlling flow into the interior chamber. A rotatable shaft is mounted to the casing and configured to displace the valve between open and closed positions when the shaft moves between first and second angular positions. A pinion gear is coupled with the shaft such that angular movement of the shaft angularly displaces the pinion gear. Further, a rack gear is engaged with the pinion gear such that the angular displacement of the pinion gear linearly displaces the rack gear, the rack gear linear displacement being generally proportional to angular displacement of the pinion gear. Furthermore, a sensor is configured to sense at least one of linear displacement and linear position of the rack gear so as to sense the position of the valve.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 6 is a greatly enlarged, front elevational view of first and second indicator members of the indicator device;

FIG. 7 is a greatly enlarged, partly broken away side cross-sectional view of the first and second members;

DETAILED DESCRIPTION OF THE INVENTION

Figure 1:
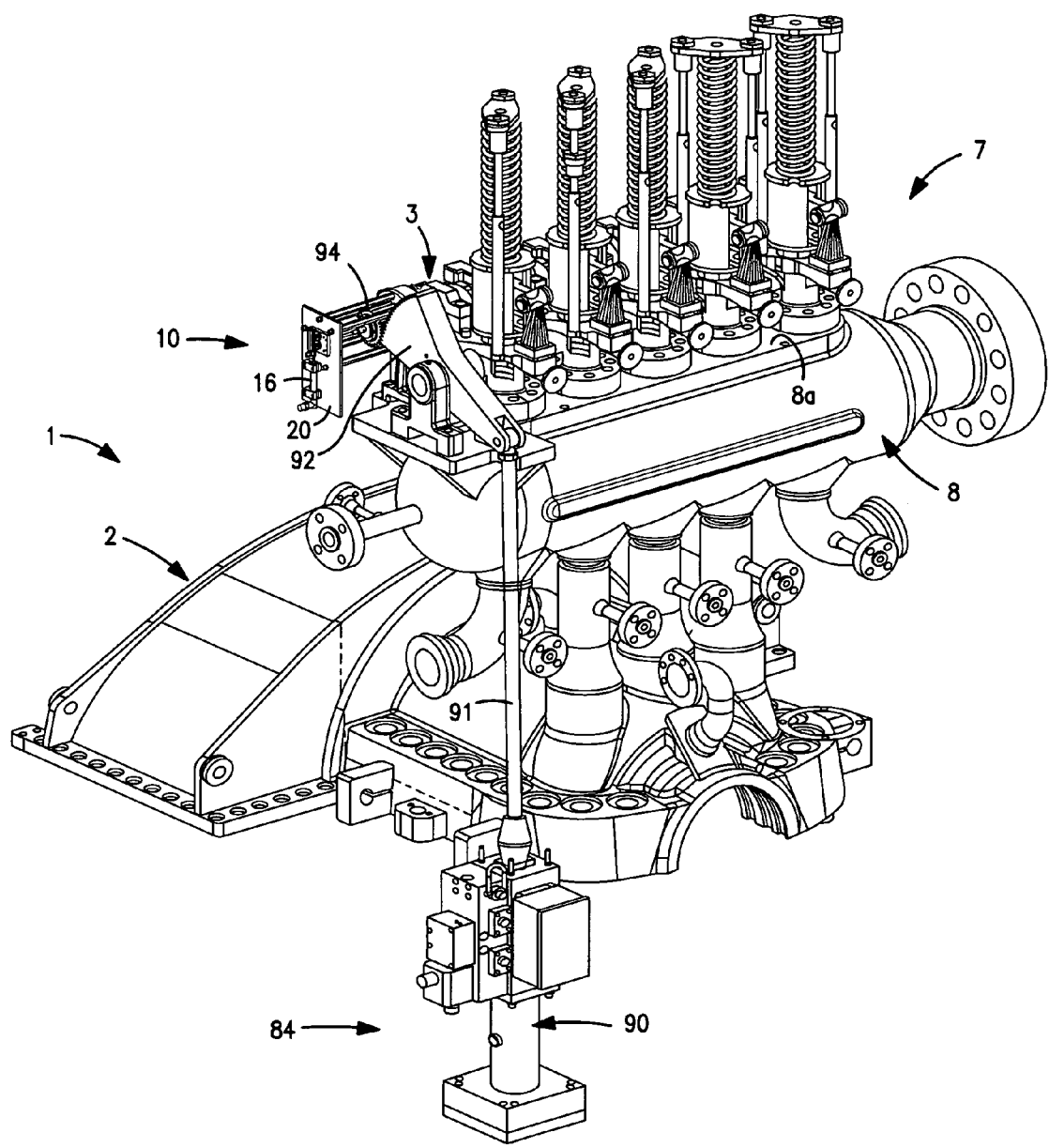
FIG. 1 is a perspective view of a steam turbine incorporating an indicator device in accordance with the present invention.
Figure 2:
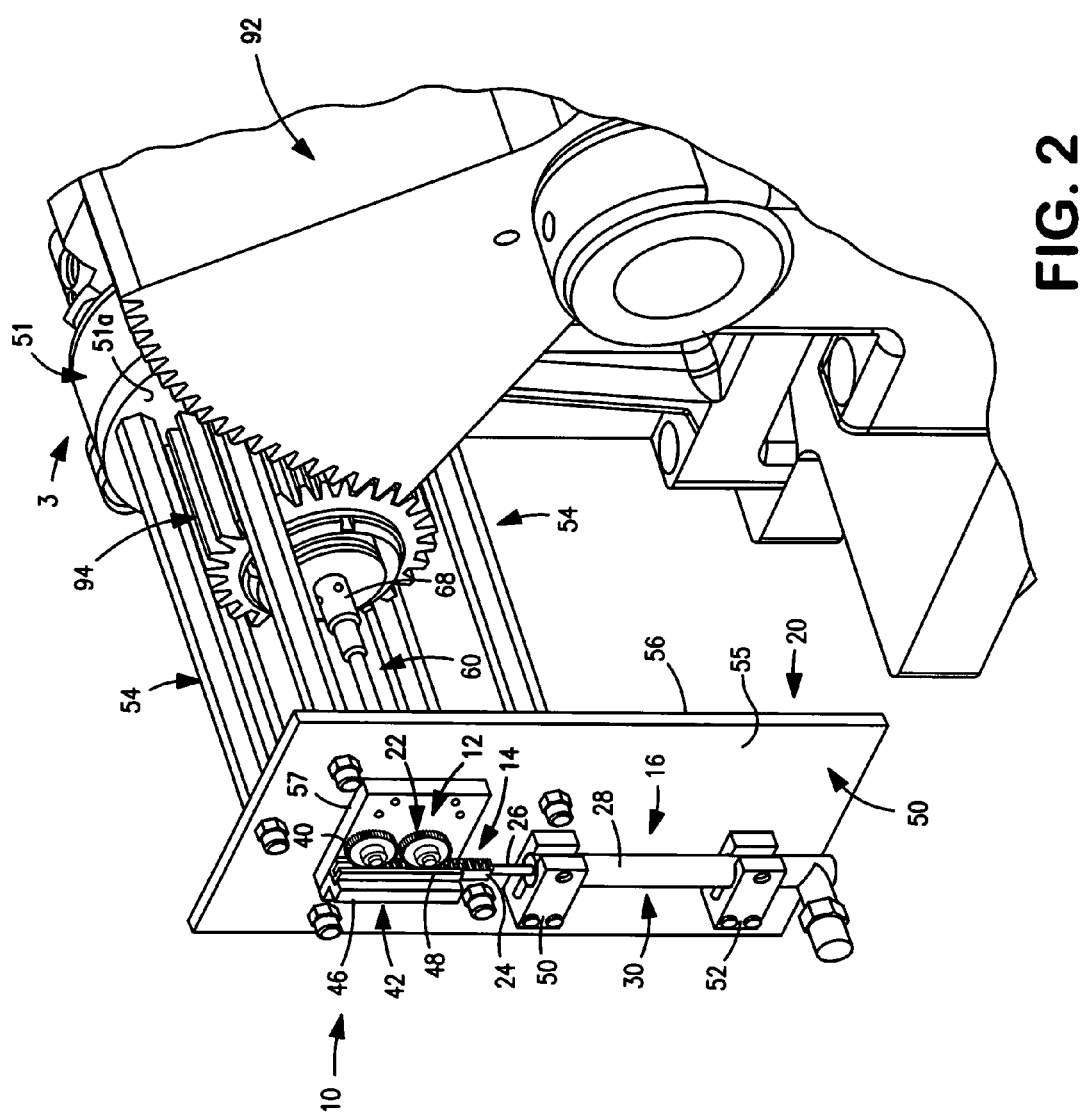
FIG. 2 is an enlarged, broken-away perspective view of a portion of the turbine and indicator device shown in FIG. 1.

Certain terminology is used in the following description for convenience only and is not limiting. The words "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import. Furthermore, throughout the following text, reference is made to two or more positions of various elements being described, and such positions are depicted in the drawing figures by indicating the relative positions of a single point on such elements. Such element points shown in the drawings are selected for convenience only and have no particular relevance to the present invention.

Referring now to the drawings in detail, wherein like numbers are used to indicate like elements throughout, there is shown in FIGS. 1-13 a position indicator device 10 for sensing an angular position $A_n$ of a rotatable element 2 of a machine 1. Preferably, the indicator device 10 is a valve position indicator device configured to sense the position of a cam shaft 3 of a steam turbine 4, so as to thereby determine the position of one or more valves 5 driven by the shaft 3, as described in detail below. However, the indicator device 10 may alternatively be used to directly (or indirectly) sense any other rotatable machine element 2 or to indirectly sense another linearly or rotatably displacing element, a detailed description of which is beyond the scope of the present disclosure. Basically, the indicator device 10 includes a first, rotatable indicator member 12, a second, linearly displaceable indicator member 14, and a sensor 16. The first indicator member 12 is coupled with the rotatable element 2 such that angular movement of the rotatable element 2 angularly displaces the first member 12 about an axis 12a by a corresponding amount. The second indicator member 14 is coupled or engaged with the first member 12 such that the angular movement of the first member 12 linearly displaces the second member 14 along an axis 14a. Further, the sensor 16 is configured to sense linear displacement and/or the linear position of the second indicator member 14, so as to thereby sense or determine the angular position $A_n$ of the rotatable element 2.

Figure 9:
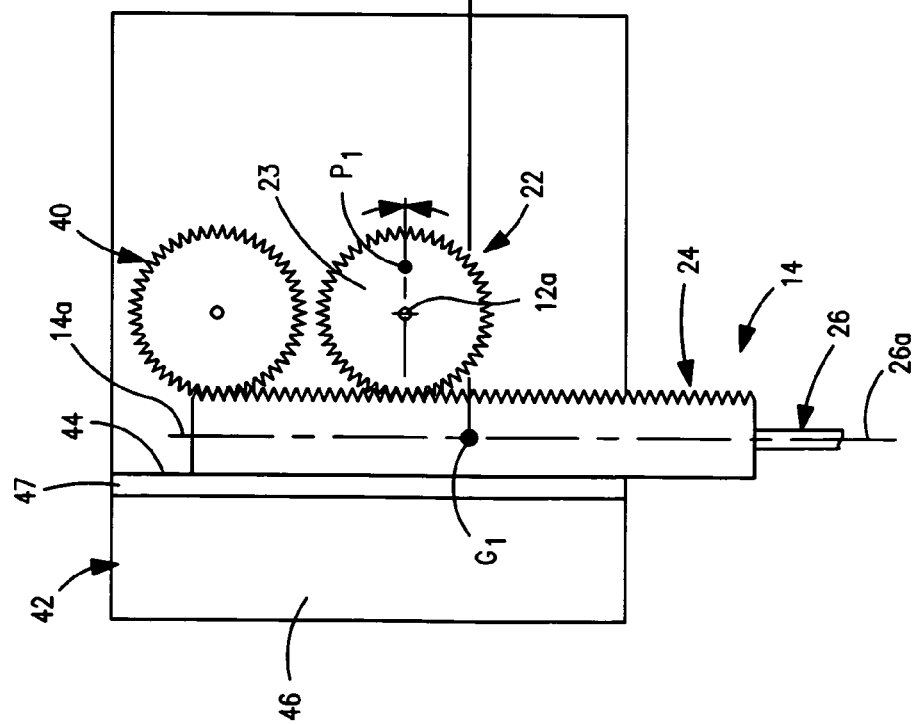
FIG. 9 is another more diagrammatic view of the first and second members and the sensor portion of FIG. 8, shown with the first and second members each disposed at a second limit position.
Figure 10:
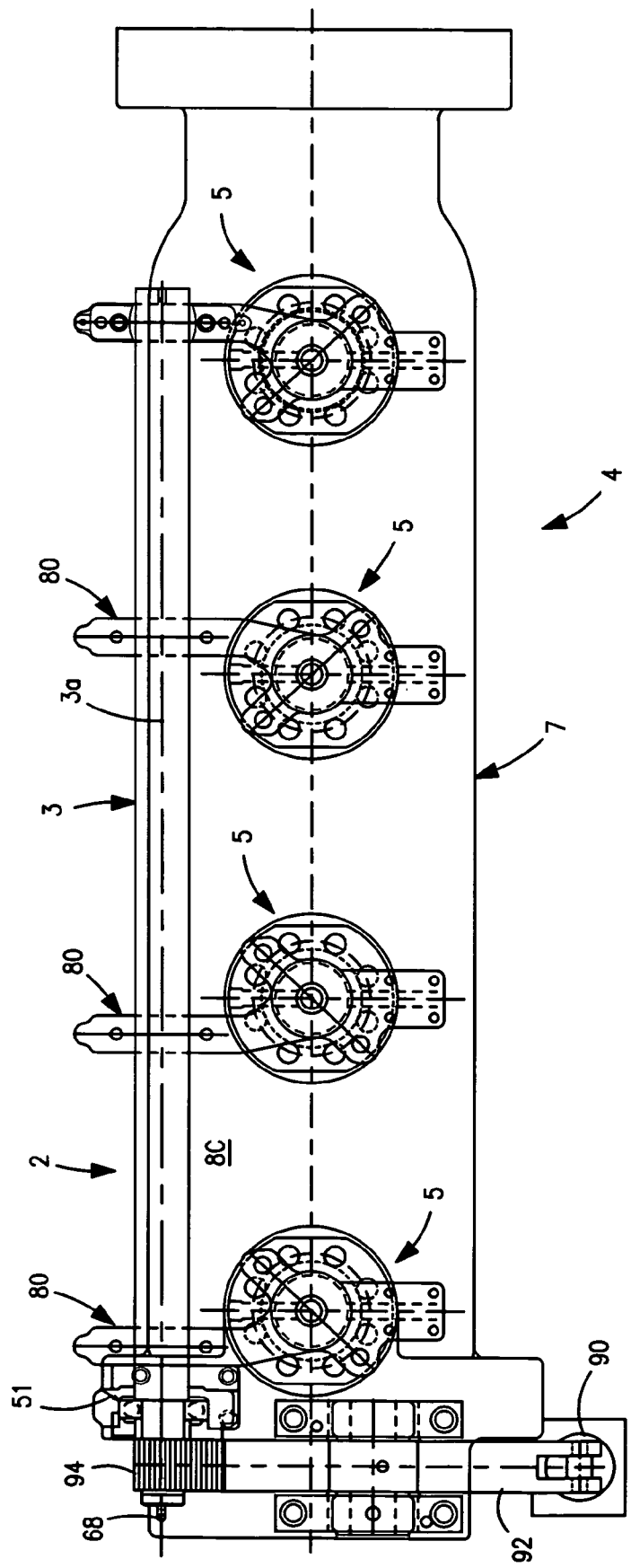
FIG. 10 is a top plan view of the steam turbine, showing a rotatable cam shaft and a plurality of valves.

More specifically, the second indicator member 14 is coupled with the first indicator member 12 such that linear displacement $l_D$ of the second member 14 is at least generally proportional to angular displacement $a_D$ of the first member 12, as indicated in FIG. 9. The sensor 16 may be configured to sense an amount of linear displacement $l_D$ of the second member 14, and thereby the angular displacement $a_D$ of the first indicator member 12, or/and to sense one or more particular linear positions of the second member 14, thereby sensing corresponding angular positions of the first member 12. Preferably, the sensor 16 is configured to generate and transmit at least one signal $S_n$ (FIG. 13) to a control 18 configured to determine the angular position $A_n$ of the rotatable element 2 (or to directly determine the position of the preferred valve(s) 5) from the sensor signal $S_n$, as described in further detail below. Additionally, the indicator device 10 preferably further comprises a base 20 configured to support at least the first and second indicator members 12, 14 and connectable with the machine 1 so as to locate the first member 12 at least generally proximal to the rotatable element 2, as is also discussed in detail below, although the basic components 12, 14 and 16 may be directly mounted to the machine 1 or separately supported.

Most preferably, when the rotatable element 2 is or includes a cam shaft 3 as discussed above, the first indicator member 12 includes a "drive" pinion gear 22 coupled with the cam shaft 3, and the second member 14 includes a rack gear 24 engaged with the pinion gear 22. The cam shaft 3 has a central axis 3a and is pivotable about the axis 3a between a first angular position $A_1$ (FIG. 11) and a second angular position $A_2$ (FIG. 12). Preferably, the shaft 3 is configured to displace at least one and most preferably a plurality of valves 5 each between a closed position $V_C$ (FIG. 11) and a "fully open" position $V_O$ (FIG. 12) as the cam shaft 3 moves between the shaft first and second angular positions $A_1$, $A_2$. That is, the cam shaft 3 displaces the valve(s) 5 by means of one or more cam and lifter assemblies (described below) such that each valve 5 is at the closed position $V_C$ when the cam shaft 3 is located at the first limit position $A_1$ and is the valve 5 is at the fully open position $V_O$ when the cam shaft 3 is disposed at the second limit position $A_2$. Further, the first member pinion gear 22 is connected with the cam shaft 3, preferably by a flexible coupler 60 (described below), such that shaft rotation angularly displaces the pinion gear 22 generally about the shaft axis 3a. Specifically, angular displacement of the cam shaft 3 between the two shaft limit positions $A_1$, $A_2$ angularly displaces the drive pinion gear 22 about a generally parallel axis 27a between a first angular limit position $P_1$ (FIG. 8) and a second angular limit positions $P_2$ (FIG. 9), as discussed in greater detail below. Preferably, the drive pinion gear 22 includes a generally circular body 23 with a central hub 23a and plurality of radially-extending, circumferentially spaced gear teeth 25. An elongated central shaft 27 extends through the body 23 and is rotatable about a central axis 27a, the shaft axis 27a providing the first member axis 12a, as discussed above.

Figure 8:
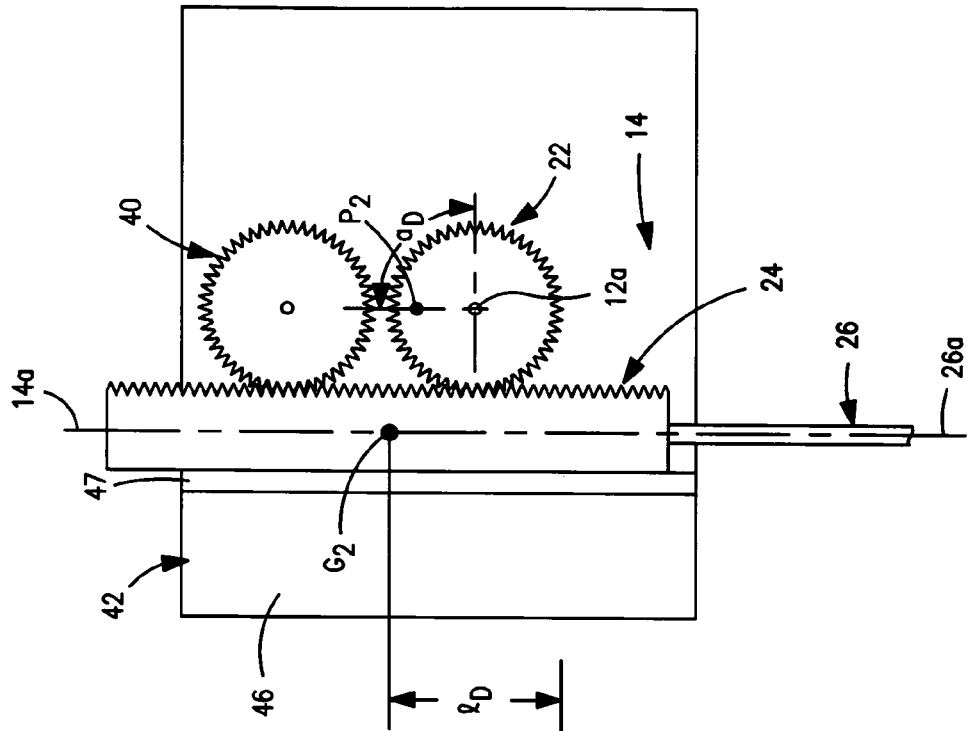
FIG. 8 is a more diagrammatic view of the first and second members and a portion of a sensor, shown with the first and second members each disposed at a first limit position.

Furthermore, the second member rack gear 24 is engaged with the pinion gear 22 such that rotation of the cam shaft 3 linearly displaces the rack gear 24 along the axis 14a between a first position $G_1$ (FIG. 8) and a second position $G_2$ (FIG. 9). Specifically, as described above, rotation of the cam shaft 3 between the first and second angular positions $A_1$ and $A_2$ rotates the drive pinion gear 22 between the pinion gear first and second limit positions $P_1$ and $P_2$, respectively. During such angular displacement, the pinion gear 22 correspondingly drives the engaged rack gear 24 to displace linearly between the rack gear first and second linear limit positions $G_1$, $G_2$, as depicted in FIGS. 8 and 9. Preferably, the rack gear 24 includes an elongated body 29 with opposing, vertically extending sides 29a, 29b, the one side 29a having a plurality of vertically spaced teeth 31 engageable with the pinion gear teeth 25 and the other side 29b having vertical slide surface 33, and a connective opening 35.

Additionally, the sensor 16 is configured to sense when the preferred rack gear 24 is generally disposed at the first limit position $G_1$, the second limit position $G_2$, or/and one or more intermediate positions (none depicted) located on the axis 14a between the two limit positions $G_1$, $G_2$. Preferably, the sensor 16 is configured to sense the rack gear 24 at all of the rack gear positions $G_n$ (i.e., the limit and intermediate positions) and thereby determine when the cam shaft 3 is located at the two angular limit positions $A_1$, $A_2$ and at each intermediate angular position $A_n$ therebetween (none depicted). Further, the control 18 is preferably configured to use such cam shaft position information to determine when the preferred valve(s) 5 are located at each "point" in a valve displacement cycle, as described in detail below. However, the sensor 16 may alternatively be configured to sense only when the rack gear 24 is located at one or more specific positions $G_n$, such as one or both limit positions $G_1$, $G_2$, such that the control 18 determines therefrom only when the one or more valves 5 are located at a particular point(s) in the valve displacement cycle, for example, the valve closed and valve fully open positions $V_C$, $V_O$.

More specifically, the sensor 16 preferably includes a moveable portion 26 coupled with the rack gear 24 and moveable along an axis 26a (collinear or parallel with the rack gear axis 14a), and a fixed portion 28 spaced from the rack gear 24 and configured to sense at least one position of the sensor moveable portion 26. Most preferably, the sensor 16 is a linear variable differential transformer or "LVDT" 30, such that the sensor moveable portion 26 includes an armature 34 with a core member 36 and the sensor fixed portion 28 includes a plurality of coils 38 (see FIG. 5). The sensor armature 34 is linearly displaceable along the axis 26a and the sensor fixed portion coils 36 are configured to generate an electrical signal $S_n$ corresponding to each position of the armature 34 along the axis 26a. Further, the sensor 16 is preferably configured to generate and transmit a signal $S_P$ when the sensor 16 determines that the rack gear 24 is located at least one, and preferably all of, the first and second limit positions $G_1$, $G_2$ and each intermediate position $G_{1n}$ located therebetween. More specifically, the preferred LVDT 30 generates a plurality of signals $S_{Pn}$, each signal $S_{Pn}$ (e.g., $S_{P1}$, $S_{P2}$, etc.) corresponding to a separate one of the first limit position $G_1$, the second limit position $G_2$, and each one of a plurality of intermediate positions $G_{1n}$ between the two limit positions $G_1$, $G_2$. However, the sensor 16 may alternatively be configured to generate a signal $S_{Pn}$ only when the rack gear 24 is located at one or more specific positions, such as when the rack gear is disposed at rack first limit position and/or second limit positions, so as to indicate when the valve is at the closed and/or fully open positions $V_C$, $V_O$.

Alternatively, the sensor 16 may constructed so as to directly sense the rack gear 24 or an extension member (not shown) connected with the gear 24 (e.g., an elongated bar, etc.). For example, the sensor 16 may be an encoder, a proximity sensor, etc. configured to either sense displacement of the rack gear 24 or the extension member or/and to sense when the rack gear 24/extension member is located at one or more particular positions, for example by sensing when the gear/extension member is proximal to the sensor 16. Furthermore, the sensor 16 may be constructed in any other appropriate manner capable of sensing the second indicator member 12 (preferably the rack gear 24) to determine angular position of the rotatable element 2/shaft 3, and the scope of the present invention is in no manner limited to any particular structure, arrangement, operational parameter, etc. of the sensor 16.

Referring to FIGS. 3-9, the indicator device 10 preferably further comprises an idler pinion gear 40 engaged with the rack gear 24 and a retainer 42 configured to slidably retain the rack gear 24, the idler gear 40 and retainer 42 also being generally connected with the machine 1. The idler pinion gear 40 is spaced from, preferably vertically above, the drive pinion gear 22, and is engaged with the rack gear 24 such that when the drive pinion 22 rotates the rack gear 24, the idler pinion gear 40 is driven to rotate about a central axis 40a by movement of the rack gear 24. Preferably, the idler pinion gear 40 includes a generally circular body 41 with a central hub and a plurality of radially-extending, circumferentially spaced gear teeth 43, and an elongated central shaft 45 extending through the body 41. Further, the retainer 42 is configured to slidably retain the rack gear 24 and has a bearing surface 44, the rack gear slide surface 31 being disposeable against the retainer bearing surface 44.

Specifically, the rack gear 24 is disposed generally between the retainer bearing surface 44 and the two pinion gears 22, 40. As such, the rack gear 24 slides against the bearing surface 44 while the pinion gear 22 drives the rack gear 24 between the first and second linear limit positions $G_1$, $G_2$, the idler pinion 40 functioning to maintain the rack gear 24 disposed against the retainer 42 so as to prevent sideways movement or pivoting of the gear 24. Preferably, the retainer 42 includes a generally S-shaped (or Z-shaped) elongated plate 46, a slide member 47 mounted to a central vertical edge 46a of the main plate 46, and a generally rectangular cover plate 48 attached to a rear vertical surface 46b of the main plate 46. The slide member 47 provides the bearing surface 44 and is preferably formed of Teflon or a similar material. The cover plate 48 is configured to at least partially overlap the rack gear 24, such that the rack gear 24 is retained between the cover plate 48 and a base 20, as described below.

As best shown in FIGS. 1-5, the preferred indicator base 20 is connectable with the machine 1 so as to locate the pinion gear 22 at least generally proximal to the rotatable element 2 (i.e., cam shaft 3). More specifically, the indicator base 20 is configured to support the pinion gear 22, the rack gear 24, the sensor 16, the idler pinion gear 40 and the retainer 42. Preferably, the base 20 includes a generally rectangular base plate 50 and a plurality of connective members 54, most preferably four members 54. The base plate 50 has an outer, vertical mounting surface 55 and an opposing, inner vertical surface 56, the drive and idler pinion gears 22, 40, respectively, the sensor 16, and the retainer member 42 being connected with the mounting surface 55. The connective members 54 each extend between the plate inner surface 56 and a facing surface 51a of a shaft bearing member 51 rotatably supporting the cam shaft 3, and are generally circumferentially spaced about a drive gear 94 disposed on the end of the cam shaft 3, as described below. Preferably, the base 20 further includes a generally rectangular spacer plate 57 disposed on the base plate mounting surface 56, the retainer main plate 46 and the two pinion gears 22, 40 being mounted to the spacer plate 57, the preferred LVDT sensor 30 being attached to the mounting surface 55 by a pair of mounting blocks 52 so as to be located generally below the spacer plate 57.

Figure 3:
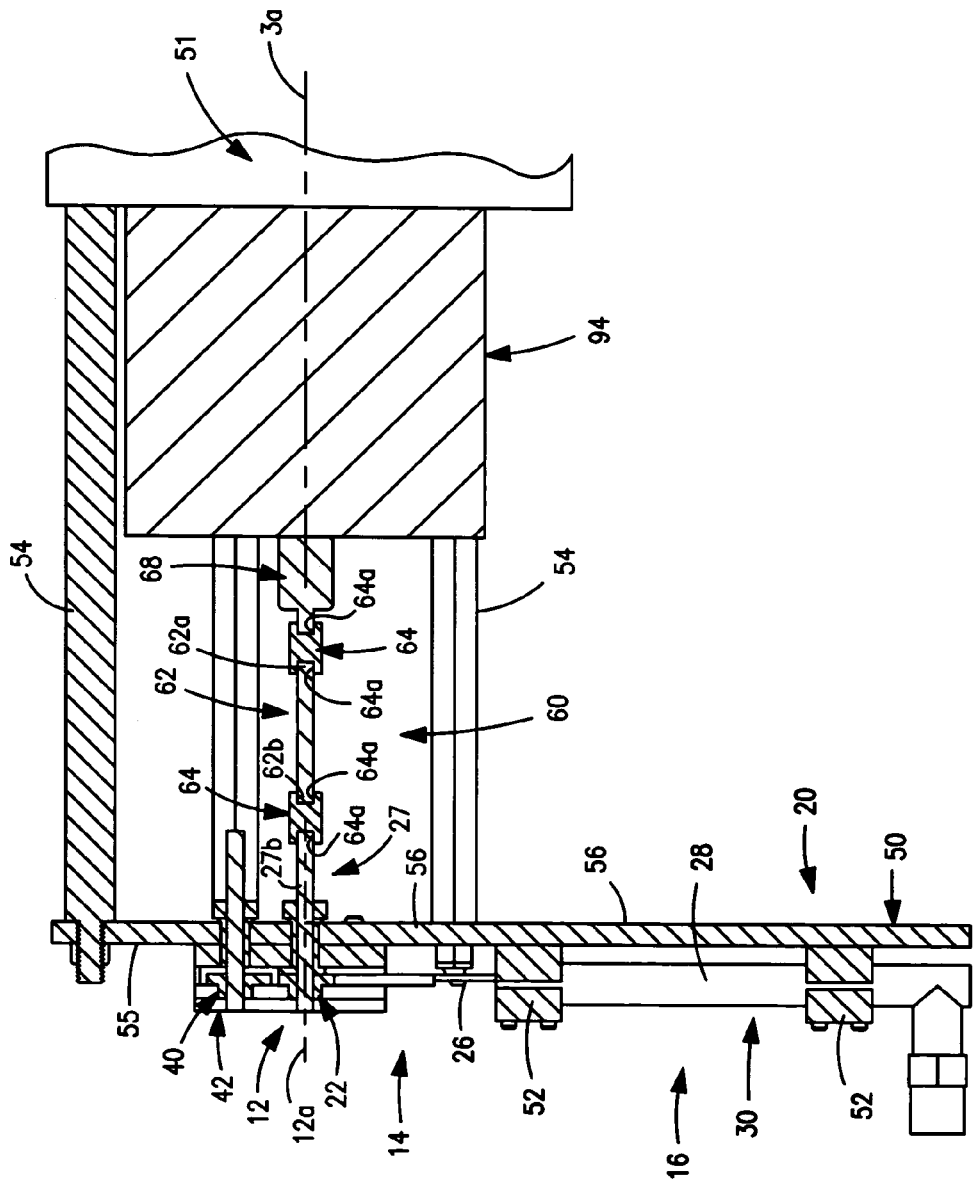
FIG. 3 is an enlarged, side cross-sectional view of the indicator device and an end of a preferred cam shaft.
Figure 5:
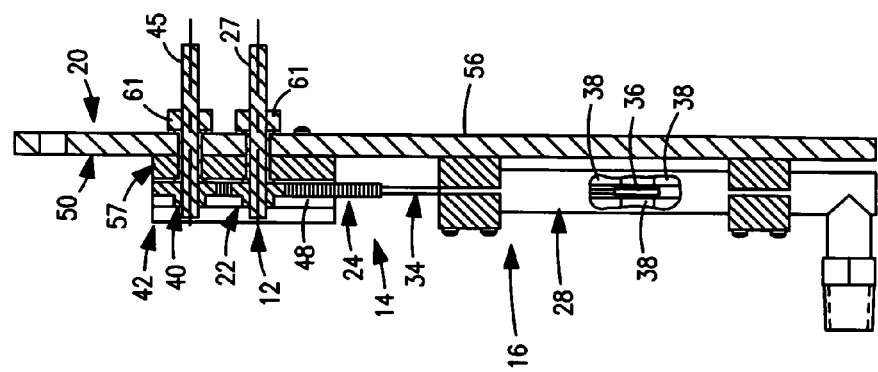
FIG. 5 is a more enlarged, side cross-sectional view of the indicator device, taken through line 5-5 of FIG. 4.
Figure 4:
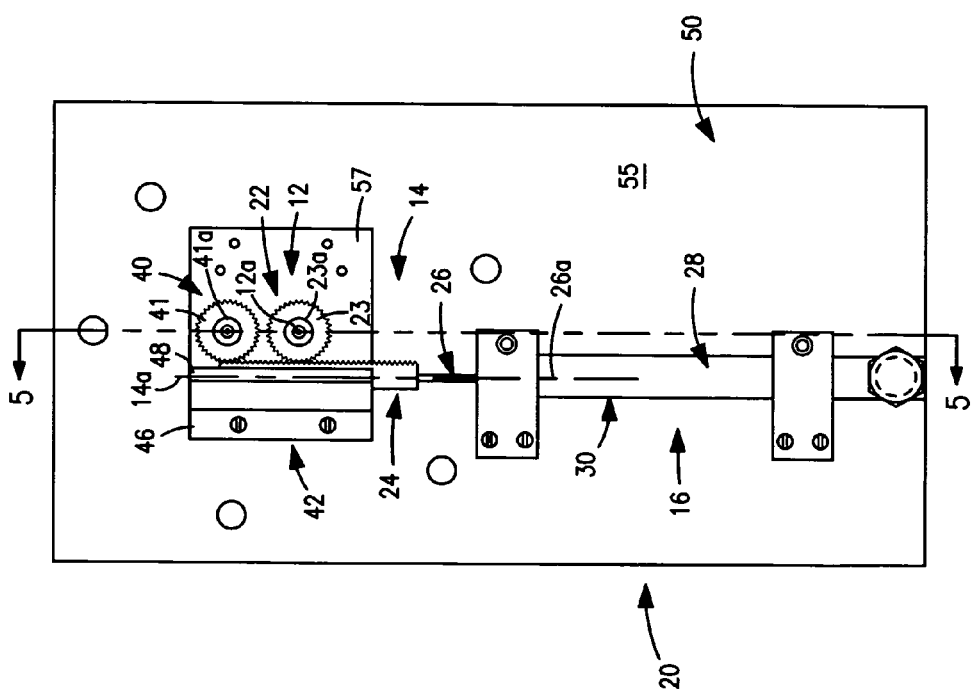
FIG. 4 is a more enlarged, front elevational view of the indicator device.

Referring to FIGS. 3 and 7, preferably, each one of the base plate 50 and the spacer plate 57 has a pair of holes 53, 58 aligned with one corresponding hole 58, 53 of the other plate 57, 52. A bearing 59 extends through each one of the pairs of aligned holes 53/58 and each pinion gear shaft 27, 45 is rotatably disposed in a separate one of the bearings 59 so as to rotatably mount the particular pinion gear 22, 40 to the base plate 50. When mounted to the base plate 50, each gear shaft 27, 45 has an inner portion 27b, 45a extending outwardly from the plate inner surface 55 and generally toward the cam shaft 3, a separate retaining nut 61 being disposed on each shaft 27, 45. Further, the indicator device 10 further includes at least one flexible coupler 60 configured to connect the drive pinion gear 22 with the cam shaft 3 such that the cam shaft and pinion gear axes 3a, 12a are either generally collinear, generally parallel, or generally converging.

In other words, the cam shaft 3 rotatably drives the drive pinion gear 22 through the flexible coupler 60, regardless of whether or not the two axes 3a, 12a are precisely collinear so as to account for manufacturing tolerances. As best shown in FIG. 3, the coupler 60 preferably includes a cylindrical main body 62 having opposing ends 62a, 62b and two tubular, bellows-like members or "bellows" 64 each having opposing open ends 64a. One end 64a of each coupler bellows 64 is disposed on a separate end 62a, 62b, respectively, of the coupler main body 62. The other end 64a of one bellows 66 is disposed on the drive pinion shaft inner portion 27b and the other end 66a of the other bellows member 66 is disposed on a stub shaft 68 (FIG. 3) extending from the cam shaft 3 along the cam shaft axis 3*a*. With this structure, the cam shaft 3 drives the pinion gear 22 through the coupler 60 by rotating the stub shaft 68, the second bellows member 66, the coupler main body 62, the first bellows member 64, and the gear shaft 27. Further, the cam shaft 3 may alternatively be coupled with the inner portion 45*a* of the gear shaft 45 instead of shaft inner portion 27*b*, in which case the gear 40 functions as the drive pinion gear and the gear 22 functions as the idler pinion gear.

Referring now to FIGS. 1-3 and 10-12, the preferred steam turbine 4 further includes a steam distributor or "steam chest" 7 including a casing 8 with an interior chamber 8*a* and a plurality of steam outlets 8*b* (only one shown), each valve 5 controlling flow through a separate one of the outlets 8*b*. Each valve 5 preferably includes a moveable valve element 5*a*, preferably a plug, a stem 5*b* connected with the valve plug 5*a* for displacing the plug 5*a*, and body 5*c* movably (i.e., slidably) supporting the valve stem 5*b*. The cam shaft 3 is mounted to an upper, exterior surface 8*c* of the steam chest casing 8 and is configured to operate or displace the moveable portions 5*a*, 5*b* of each one of the valves 5 as the shaft 3 rotates between the two limit positions $A_1$, $A_2$. Specifically, the steam turbine 4 preferably further includes a plurality of cam-follower mechanisms 78 coupled with shaft 3, each cam-follower mechanism 78 displacing a separate one of the valves 5, and an actuator 84 for rotatably displacing the cam shaft 3, most preferably to periodically oscillate the shaft 3 between the two angular limit positions $A_1$, $A_2$.

Figure 11:
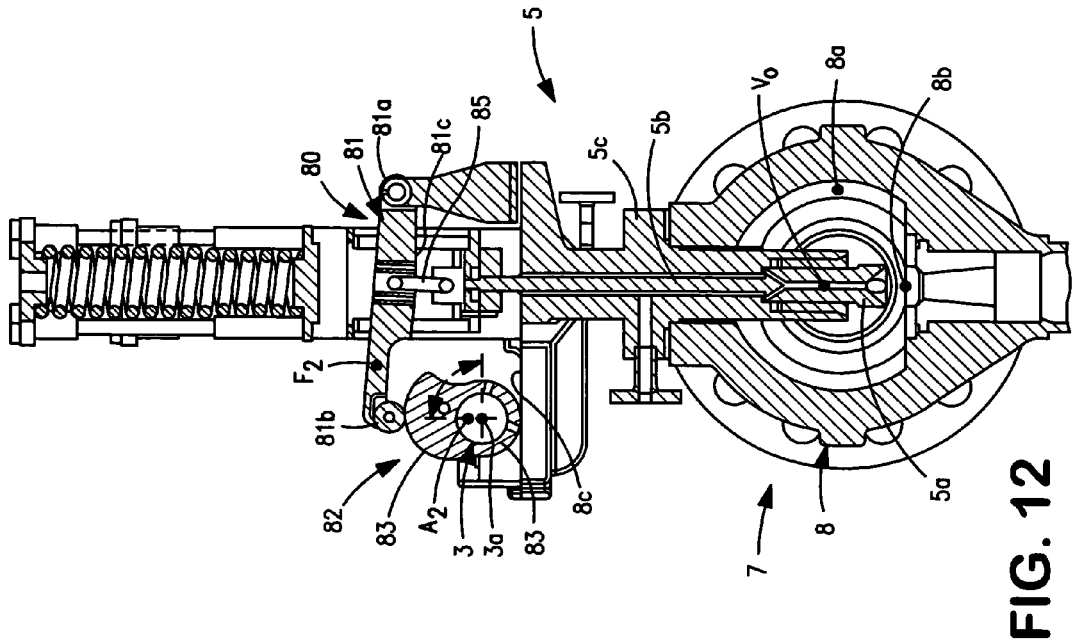
FIG. 11 is a radial cross-sectional view of one valve of FIG. 10, showing the valve in a closed position.
Figure 12:
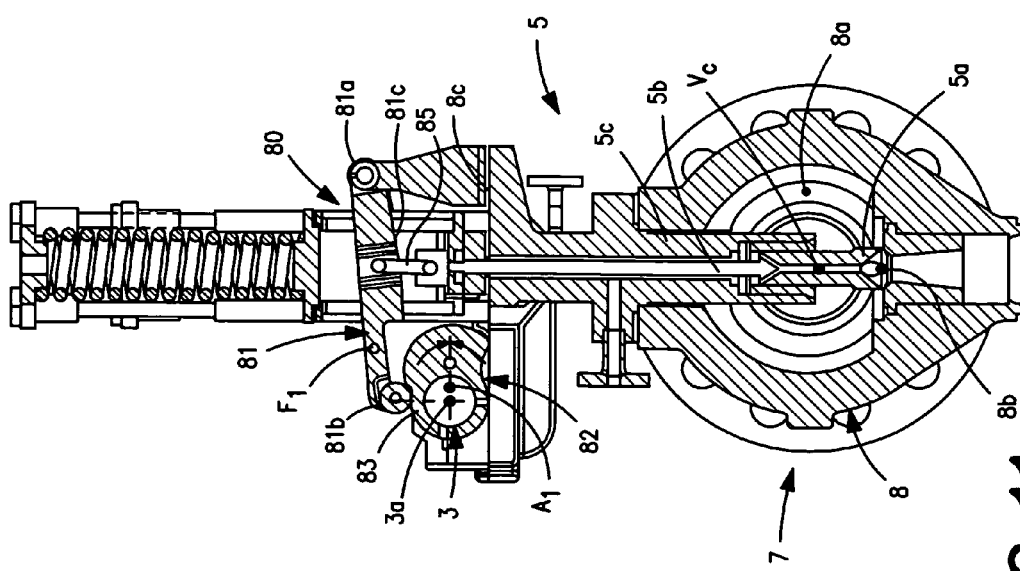
FIG. 12 is a radial cross-sectional view of one valve of FIG. 10, showing the valve in a fully open position.

Referring particularly to FIGS. 11 and 12, each cam-follower mechanism 78 includes a follower or valve "lifter" 80 connected with and configured to displace one of the valves 5 and a cam 82 mounted to the cam shaft 3 and configured to displace one of the lifters 80. Each follower/lifter 80 is configured to displace a separate one of the valves 5 between the valve closed and fully open positions $V_C$, $V_O$. The lifters 80 each preferably include an elongated body 81 having a first end 81*a* pivotally connected with the casing 8, an opposing, driven end 81*b* disposed against one of the cams 82, and a central portion 81*c* connected with the associated valve 5, preferably by a pivotable connecting rod 85 extending between the central portion 81*c* and the associated valve stem 5*b*. Further, the cams 82 are each configured to drive a separate one of the followers 80 when the shaft 3 rotates between the first and second shaft positions $A_1$, $A_2$. Preferably, each cam 82 has an eccentric body 83 with a camming surface 83, the follower driven end 81*b* being moved by the camming surface 83 as the shaft 3 rotates the cam 82 so as to oscillate the follower 80 between a lower position $F_1$ (FIG. 11) and an upper position $F_2$ (FIG. 12). As the follower 80 moves between the upper and lower positions $F_1$, $F_2$, the lifter 80 displaces the moveable portions 5*a*, 5*b* of the coupled valve 5 between the closed position $V_C$ and a fully open position $V_O$. Preferably, each camming surface 83 is configured to provide at least one "dwell period" such that the connected valve 5 is generally located at either the closed or fully open positions for a period of time as the cam 82 (and shaft 3) continue to rotate between the shaft limit positions $A_1$, $A_2$, but may be constructed in any appropriate manner.

Figure 13:
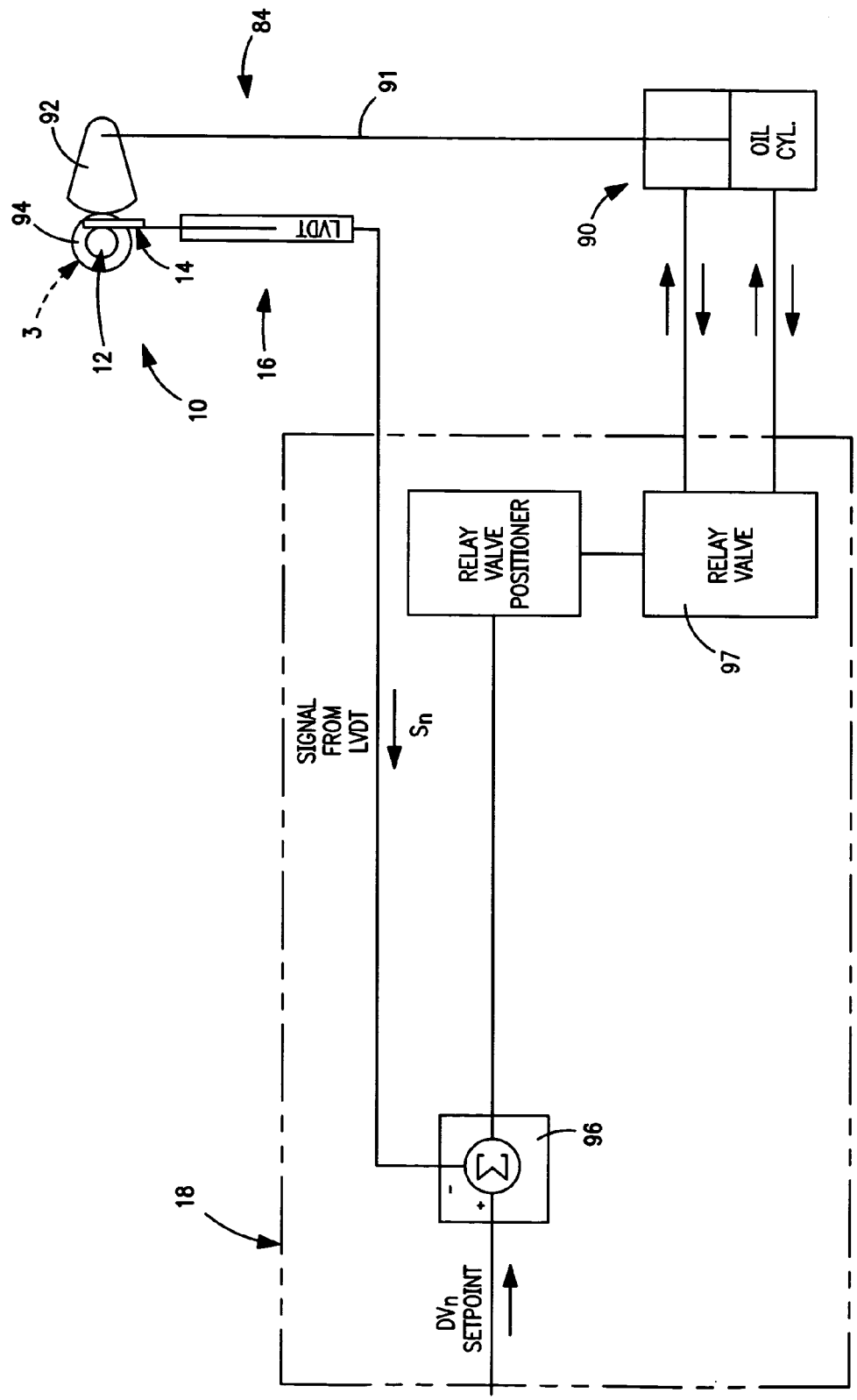
FIG. 13 is a schematic view of a sensor of the indicator device shown incorporated in a valve control system.

Referring now to FIGS. 1-3, 10 and 13, as discussed above, the actuator 84 is configured to periodically rotate the cam shaft 3 between the shaft first and second limit angular positions $A_1$, $A_2$ so as to continuously open and close the valve(s) 5 during operation of the steam turbine 4. Preferably, the actuator 84 includes a hydraulic cylinder 90 with a moveable piston 91, a rocker gear 92 pivotally mounted to the turbine 4, preferably to the steam chest casing 8 and connected with the piston 90, and a drive pinion gear 94 mounted to the cam shaft 3. The piston 91 alternatively extends and retracts so as to pivot or "rock" the coupled rocker gear 92, thereby rotating the engaged pinion gear 94 in opposing angular directions to periodically displace the cam shaft 3 between the first and second end positions $A_1$, $A_2$. As depicted in FIG. 13, the control 18 is configured to operate the actuator 84 such that the actuator 84 periodically rotatably displaces the shaft 3 to move the valves 5 through a plurality of desired positions within a predetermined period of time. In other words, the control 18 directs the rate and timing of the extension and retraction of the preferred cylinder actuator 84, so as to thereby open and close the valves 5 within a specific amount of time and at specified points in the operation of the turbine 4.

With the above structure, the sensor 16 generates and transmits the signals $S_n$ to the control 18 when the rack gear 24 is located at each one of a plurality of the gear linear positions $G_n$. The control 18 is configured to sense or determine valve position $V_n$ (i.e., $V_C$, $V_O$, etc.) from each rack position signal $S_n$ and adjusts operation of the actuator 84 whenever the sensed valve position $V_n$ varies from a desired valve position $DV_n$ stored within or inputted to the control 18. More specifically, the control 18 preferably includes at least one controller 96 that is programmed, etc., to operate the actuator 84, preferably through a relay valve 97 coupled with the cylinder 90, to periodically open and close all the valves 5 within a specified time period during turbine operation. When the control 18 determines that the valves 5 have not/are not displacing in the desired manner, the control 18 adjusts actuator operation as necessary so that the valves 5 are closed and opened at the appropriate turbine operational points and/or within the desired time period. Thus, the control 18 ensures that the valves 5 are periodically displaced between the closed and fully open positions $V_C$, $V_O$ within the predetermined time period and at the proper operational points continuously during operation of the steam turbine 4.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

I claim:

1. An indicator device for sensing an angular position of a rotatable element of a machine, the rotatable element including a cam shaft having a central axis and being pivotable about the axis between first and second angular positions, the shaft being configured to displace a valve between an open position and a closed position as the shaft moves between the shaft first and second positions, the indicator device including:

a first indicator member coupled with the rotatable element such that angular movement of the rotatable element angularly displaces the first member, the first member including a drive pinion gear connected with the cam shaft such that shaft rotation angularly displaces the gear generally about the shaft axis;

a second indicator member coupled with the first member such that the angular movement of the first member linearly displaces the second member, the second member including a rack gear engaged with the pinion gear such that rotation of the cam shaft linearly displaces the rack gear between a first position and a second position; and a sensor configured to sense at least one of linear position and linear displacement of the second indicator member so as to sense the angular position of the rotatable element.

2. The indicator device as recited in claim 1 wherein:
the second member is coupled with the first member such that linear displacement of the second member is proportional to angular displacement of the first member; and
the sensor is configured to sense an amount of linear displacement of the second member.

3. The indicator device as recited in claim 1 wherein the sensor is configured to generate and transmit a signal to a control configured to determine the angular position of the rotatable element from the sensor signal.

4. The indicator device as recited in claim 1 wherein the rotatable element is incorporated into a machine and the indicator device further comprises a base configured to support at least the first and second indicator members and connectable with the machine so as to locate the first member proximal to the rotatable element.

5. The indicator device as recited in claim 1 wherein the sensor is configured to sense when the rack gear is disposed at at least one of the first position, the second position, and an intermediate position located between the first and second positions.

6. The indicator device as recited in claim 1 wherein the sensor includes a moveable portion coupled with the rack gear and a fixed portion spaced from the rack gear and configured to sense at least one position of the moveable portion.

7. The indicator device as recited in claim 6 wherein the sensor is a linear variable differential transformer, the sensor moveable portion includes an armature linearly displaceable along an axis, and the sensor fixed portion includes a plurality of coils configured to generate an electrical signal corresponding to each position of the armature on the axis.

8. The indicator device as recited in claim 1 wherein:
at least a portion of the sensor is spaced from the rack gear;
the indicator second member includes an elongated bar connected with the rack gear such that displacement of the rack by an amount of distance displaces the bar by a generally equal amount of distance; and
the sensor is configured to sense one of when at least a portion of the bar is located proximal to the sensor and a position of the bar with respect to the sensor.

9. The indicator device as recited in claim 1 wherein the sensor is configured to generate and transmit a signal when the sensor determines that the rack gear is located at at least one of the first and second positions.

10. The indicator device as recited in claim 9 wherein the sensor includes a linear displacement voltage transducer configured to generate a plurality of signals, each signal corresponding to a separate one of the first position, the second position, and a plurality of intermediate positions between the first and second positions.

11. The indicator device as recited in claim 1 further comprising:
an idler pinion gear spaced from the drive pinion gear and engaged with the rack gear; and
a retainer member configured to slidably retain the rack gear and having a bearing surface, the rack gear being disposed generally between the retainer bearing surface and the two pinion gears such that the rack gear slides against the bearing surface while the pinion gear drives the rack gear between the first and second linear positions.

12. The indicator device as recited in claim 11 further comprising a base member connectable with the machine so as to locate the pinion member proximal to the rotatable element and configured to support the pinion gear, the rack gear, the sensor, and the retainer member.

13. The indicator device as recited in claim 1 wherein:
each one of the cam shaft and the pinion gear is angularly displaceable about a separate central axis; and
the indicator device further comprises at least one flexible coupler configured to connect the pinion gear with the cam shaft such that the cam shaft and pinion gear axes are one of collinear, parallel and converging.

14. An indicator device for sensing a valve of a fluid machine, the machine including a casing having at least one interior chamber, a valve controlling flow into the interior chamber, and a rotatable shaft configured to displace the valve between open and closed positions when the shaft moves between first and second angular positions, the valve indicator device comprising:
a first indicator member coupled with the shaft such that angular movement of the shaft angularly displaces the first member;
a second indicator member coupled with the first member such that the angular displacement of the first member linearly displaces the second member, the second member linear displacement being proportional to angular displacement of the first member; and
a sensor for sensing at least one of linear displacement and linear position of the second indicator member so as to sense the position of the valve.

15. The valve indicator device as recited in claim 14 wherein:
wherein the sensor is configured to generate and transmit a signal when the second indicator member is located at at least one predetermined position; and
the valve indicator further comprises a control coupled with the sensor and configured to sense a position of the valve from the sensor signal.

16. The valve indicator device as recited in claim 14 wherein:
the first member includes a drive pinion gear connected with the rotatable shaft such that shaft rotation angularly displaces the gear about the shaft axis; and
the second member includes a rack gear engaged with the pinion gear such that rotation of the shaft linearly displaces the rack gear between a first position and a second position.

17. The valve indicator device as recited in claim 16 wherein the sensor is configured to sense when the rack gear is disposed at at least one of the first position, the second position, and an intermediate position located between the first and second positions.

18. The valve indicator device as recited in claim 16 wherein the sensor includes a moveable portion coupled with the rack gear and a fixed portion spaced from the rack gear and configured to sense at least one position of the moveable portion.

19. The valve indicator device as recited in claim 18 wherein the sensor is a linear variable differential transformer, the sensor moveable portion includes an armature linearly displaceable along an axis, and the sensor fixed portion includes a plurality of coils configured to generate an electrical signal corresponding to each position of the armature on the axis.

20. The valve indicator device as recited in claim 16 further comprising:

an idler pinion gear spaced from the drive pinion gear and engaged with the rack gear; and a retainer member configured to slidably retain the rack gear and having a bearing surface, the rack gear being disposed between the retainer bearing surface and the two pinion gears such that the rack gear slides against the bearing surface while the pinion gear drives the rack gear between the first and second linear positions.

21. The valve indicator device as recited in claim 20 further comprising a base member configured to support the drive and idler pinion gears, the rack gear, the sensor, and the retainer member, the base member being connectable with the machine casing so as to locate the drive pinion gear proximal to the shaft.

22. The valve indicator device as recited in claim 16 wherein:

each one of the rotatable shaft and the pinion gear is angularly displaceable about a separate central axis; and the indicator device further comprises at least one flexible coupler configured to connect the pinion gear with the rotatable shaft such that the shaft axis and the pinion gear axis are one of collinear, parallel and converging.

23. The valve indicator device as recited in claim 16:

wherein the fluid machine further includes a follower configured to displace the valve between the open and closed positions, a cam mounted to the rotatable shaft and configured to drive the follower when the shaft rotates between the first and second shaft positions, an actuator configured to rotate the shaft between the first and second positions, and a control configured to operate the actuator such that the actuator periodically rotatably displaces the shaft to move the valve through a plurality of desired positions within a predetermined period of time; and the sensor generates and transmits a signal to the control when the rack is located at each one of a plurality of a predetermined positions, the control being further configured to sense valve position from each rack position signal and to adjust actuator operation when the sensed valve position varies from the desired valve position such that the valve is periodically displaced between the open and closed positions within the predetermined time period.

24. The indicator device as recited in claim 23 wherein the fluid machine is a steam turbine having a plurality of valves, a plurality of followers each operatively connected to a separate one of the valves, a plurality of cams mounted to the cam shaft and operatively engaged with a separate one of the followers.

25. A steam turbine comprising:

a casing having at least one interior chamber:

a valve controlling flow into the interior chamber;

a rotatable shaft mounted to the casing and configured to displace the valve between open and closed positions when the shaft moves between first and second angular positions;

a pinion gear coupled with the shaft such that angular movement of the shaft angularly displaces the pinion gear;

a rack gear engaged with the pinion gear such that the angular displacement of the pinion gear linearly displaces the rack gear, the rack gear linear displacement being generally proportional to angular displacement of the pinion gear; and a sensor for sensing at least one of linear displacement and linear position of the rack gear so as to sense the position of the valve.

* * * * *